United States Patent
Smyth et al.

(10) Patent No.: US 12,438,896 B2
(45) Date of Patent: Oct. 7, 2025

(54) METHOD AND SYSTEM FOR DETECTING A CYBERSECURITY BREACH

(71) Applicant: Royal Bank of Canada, Toronto (CA)

(72) Inventors: Cathal Smyth, Toronto (CA); Mahsa Golkar, Toronto (CA); James Ross, King City (CA); Sahar Rahmani, Toronto (CA); Vikash Yadav, Toronto (CA); Niloufar Afsariardchi, Montreal (CA); Laureline Arnaud, Brossard (CA)

(73) Assignee: Royal Bank of Canada, Toronto (CA)

( * ) Notice: Subject to any disclaimer, the term of this patent is extended or adjusted under 35 U.S.C. 154(b) by 975 days.

(21) Appl. No.: 17/543,444

(22) Filed: Dec. 6, 2021

(65) Prior Publication Data

US 2023/0179615 A1    Jun. 8, 2023

(51) Int. Cl.
*H04L 9/40*     (2022.01)
*G06F 16/901*   (2019.01)
*H04L 29/06*    (2006.01)

(52) U.S. Cl.
CPC ...... *H04L 63/1425* (2013.01); *G06F 16/9024* (2019.01); *H04L 63/1416* (2013.01)

(58) Field of Classification Search
CPC . H04L 63/1425; H04L 63/1416; H04L 63/14; H04L 63/1408; H04L 63/1433; H04L 63/20; G06F 16/9024
See application file for complete search history.

(56) References Cited

U.S. PATENT DOCUMENTS

| | | |
|---|---|---|
| 6,285,999 B1 | 9/2001 | Page |
| 6,799,176 B1 | 9/2004 | Page |
| 7,058,628 B1 | 6/2006 | Page |
| 7,269,587 B1 | 9/2007 | Page |
| 8,805,737 B1 * | 8/2014 | Chen ............... G06Q 40/00 235/380 |
| 2019/0318126 A1 * | 10/2019 | Mascaro ......... G06F 16/9535 |
| 2020/0267178 A1 * | 8/2020 | Maor ............. H04L 63/1425 |

* cited by examiner

*Primary Examiner* — Edward Zee

(57) ABSTRACT

Methods, systems, and techniques for detecting a cybersecurity breach. The cybersecurity breach may be a synthetic account or an account having been subjected to an account takeover. Electronic account data representative of accounts is obtained in which a first group of the accounts includes accounts flagged as being associated with the breach, and a second group of the accounts includes a remainder of the accounts. The computer system generates from the account data nodes representing the accounts and edges based on account metadata that connect the nodes. The computer system determines, such as by applying a link analysis method to the nodes and edges, a ranking of the accounts of at least part of the second group indicative of a likelihood that those accounts are also associated with the cybersecurity breach. That ranking may be used to identify which of those accounts is also identified with the cybersecurity breach.

19 Claims, 16 Drawing Sheets

METHOD AND SYSTEM FOR DETECTING A CYBERSECURITY BREACH

TECHNICAL FIELD

The present disclosure is directed at methods, systems, and techniques for detecting a cybersecurity breach.

BACKGROUND

"Synthetic accounts" and "account takeovers" are two types of fraud that financial institutions regularly have to address. A synthetic account is a type of account at a financial institution that is operated from its inception for fraudulent purposes and that is typically associated with a false identity. For example, an individual may open a synthetic account at a bank using fraudulent identification. An account takeover refers to an account at a financial institution that started as a legitimate account but that an individual subsequently secures control over and exploits for fraudulent purposes.

Practically, accounts at a financial institution are created, processed, and accessed in large volumes using computer systems. The desire to be able to detect synthetic accounts and account takeovers accordingly results in one or more computer problems and, in particular, cybersecurity-related problems relating to preventing misuse of those computer systems. As part of the process of hardening computer systems, there exists a need to be able to detect instances of synthetic accounts and account takeovers on those systems.

SUMMARY

According to a first aspect, there is provided a method comprising: obtaining electronic account data representative of accounts, wherein a first group of the accounts comprises one or more of the accounts flagged as being associated with a cybersecurity breach, and a second group of the accounts comprises a remainder of the accounts; generating from the account data nodes representing the accounts and edges based on account metadata that connect the nodes; determining, based on the nodes and edges, a ranking of the accounts comprising part of the second group indicative of a likelihood that the accounts of the second group are also associated with the cybersecurity breach; and based on the ranking, identifying which of the accounts of the second group satisfy a cybersecurity breach threshold.

Generating the nodes and edges may comprise visually generating a graph comprising the nodes and edges.

Determining, based on the nodes and edges, the ranking of the accounts may comprise applying a link analysis method to the nodes and edges.

Applying the link analysis method may comprise applying a personalized PageRank™ methodology.

Applying the link analysis method may comprise applying a non-personalized PageRank™ methodology.

The method may further comprise storing in an output file, according to a schema, values for the nodes and the edges.

Generating from the account data nodes representing the accounts and edges that connect the nodes may comprise: generating the nodes and edges for the first group of the accounts; identifying from the account data at least some of the second group of accounts sharing metadata with the first group of accounts; adding to the nodes and edges for the first group of the accounts the nodes for at least some of the second group of the accounts that share metadata with the first group of the accounts; and generating the edges connecting the nodes for the first group of the accounts to the nodes for at least some of the second group of the accounts.

Each of at least some of the edges may be based on any one or more of a difference in time between opening dates of the accounts represented by the nodes connected by the edge; a similarity in address strings associated with the nodes connected by the edge; a similarity of transaction histories of the nodes connected by the edge (the similarity of transaction histories may be directed); a number of electronic devices used to create or otherwise access the nodes connected by the edge; a total number of electronic devices shared between the nodes connected by the edge; a frequency at which electronic devices shared between the nodes connected by the edge are used to access the nodes connected by the edge; and a linear combination of: a total number of electronic devices shared between the nodes connected by the edge, and a frequency at which electronic devices shared between the nodes connected by the edge are used to access the nodes connected by the edge.

The edges may represent multiple types of metadata.

Determining the ranking may comprise: determining respective rankings for the multiple types of metadata; and combining the rankings for the multiple types of metadata together into an overall ranking.

Determining, based on the nodes and edges, the ranking of the accounts may comprise applying a PageRank™ methodology to the nodes and edges, and combining the rankings may comprise: respectively expressing the rankings for the multiple types of metadata as vectors; determining respective Kullback-Leibler divergence matrices for the vectors; summing rows of the divergence matrices; inverting and normalizing a resulting sum of the divergence matrices to determine a weighting; and multiplying the weighting by a PageRank™ distribution to arrive at the overall ranking.

The cybersecurity breach may comprise at least one of a synthetic account having been created on a computer system or an account having been subjected to an account takeover on the computer system.

Accordingly to another aspect, there is provided a system comprising: at least one database comprising electronic account data representative of accounts, wherein a first group of the accounts comprises one or more of the accounts flagged as being associated with a cybersecurity breach, and a second group of the accounts comprises a remainder of the accounts; at least one processor communicatively coupled to the at least one database; and at least one memory having stored thereon computer program code that is executable by the at least one processor and that, when executed by the at least one processor, causes the at least one processor to perform any of the foregoing aspects of the method or suitable combinations thereof.

According to another aspect, there is provided a non-transitory computer-readable medium having stored thereon computer program code that is executable by a processor and that, when executed by the processor, causes the processor to perform any of the foregoing aspects of the method or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
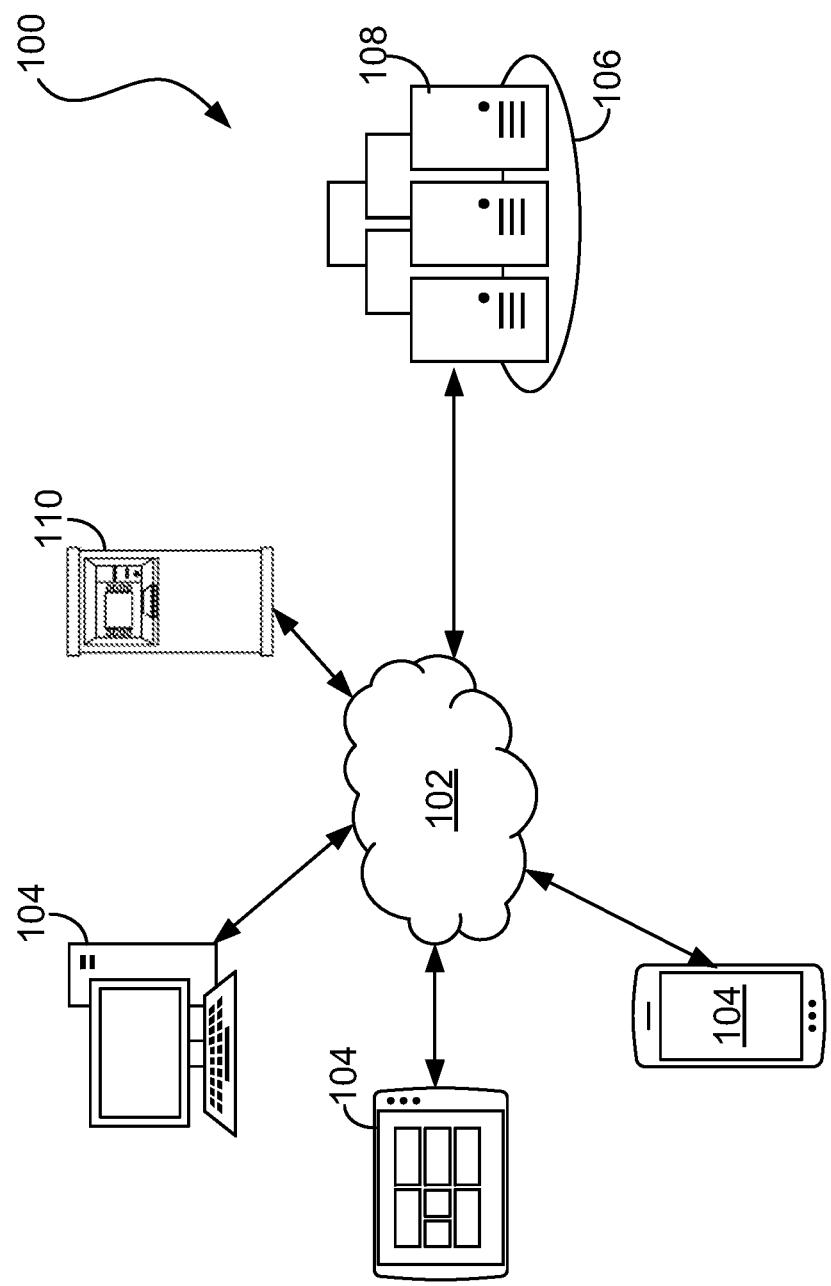
FIG. 1 depicts a computer network that comprises an example embodiment of a system for detecting a cybersecurity breach.

Various types of accounts are used by a hardened computer system to control access to different types of functionality that the computer system is able to perform. For example, in the context of a financial institution such as a bank, a computer system may be used to control access to particular bank accounts and associated functionality such as money withdrawals and transfers. An individual may use a synthetic account ("SA") or perform an account takeover ("ATO") in order, for example, to obtain and then draw down a credit line without any intent of repayment; to pass fake cheques; and, for ATOs specifically, to steal money that belongs to the individual who rightfully is associated with the account they have taken over. For example, an individual may perform an ATO to take over an account while also having created an SA, transfer money from the SA to the account compromised in the ATO, and then withdraw funds using an automated teller machine ("ATM") linked to the account compromised in the ATO.

Often, an individual will use multiple SAs and/or perform multiple ATOs to try to effect a cybersecurity breach in the form of a concerted, large scale misuse of a computer system. This results in certain cases in electronic evidence that links the various accounts associated with the concerted misuse; these links may comprise, for example, those accounts being controlled from a shared IP address or records of fund transfers between compromised accounts. Eventually, funds are transferred out of the affected computer system, such as to another bank or through an ATM.

In at least some embodiments herein, methods, systems, and techniques for detecting a cybersecurity breach are directed at identifying electronic evidence that links compromised accounts, such as SAs or accounts that have been subjected to ATOS, and from that electronic evidence detecting whether a cybersecurity breach in the form a misuse of a computer system has occurred. More particularly, a processor generates from historic transaction data associated with a number of accounts nodes and edges that connect the nodes, in which in at least some embodiments the nodes represent accounts and the edges are based on account metadata that represent various types of links/relationships between accounts. The edges may represent, for example, electronic evidence in the form of a device or connection shared between different accounts (e.g., device ID, MAC address, IP address) or similar actions performed by different accounts (e.g., account opening dates that are within a certain period of time from each other, or accounts that show similar withdrawal behavior). The processor may construct various types of visual network graphs comprising the nodes and edges. From the nodes and edges, the processor determines a proximity between accounts identified as compromised (e.g., SAs or accounts that have been taken over in ATOS) ("flagged accounts") and accounts that are not identified as, but that may in fact be, compromised ("potentially compromised accounts"). In the process of doing this, the processor may also determine proximities between various of the flagged accounts themselves. The processor scores potentially compromised accounts based on their proximity to the flagged accounts. Those potentially compromised accounts whose score satisfies a cybersecurity breach threshold are flagged as being actually compromised accounts. In some example embodiments, the processor may combine scores generated using multiple types of edges for corroboration purposes when determining scoring, as described further below.

Referring now to FIG. 1, there is shown a computer network 100 that comprises an example embodiment of a system for detecting a cybersecurity breach. More particularly, the computer network 100 comprises a wide area network 102 such as the Internet to which various user devices 104, an ATM 110, and data center 106 are communicatively coupled. The data center 106 comprises a number of servers 108 networked together to collectively perform various computing functions. For example, in the context of a financial institution such as a bank, the data center 106 may host online banking services that permit users to log in to those servers using user accounts that give them access to various computer-implemented banking services, such as online fund transfers. Furthermore, individuals may appear in person at the ATM 110 to withdraw money from bank accounts controlled by the data center 106.

Figure 2:
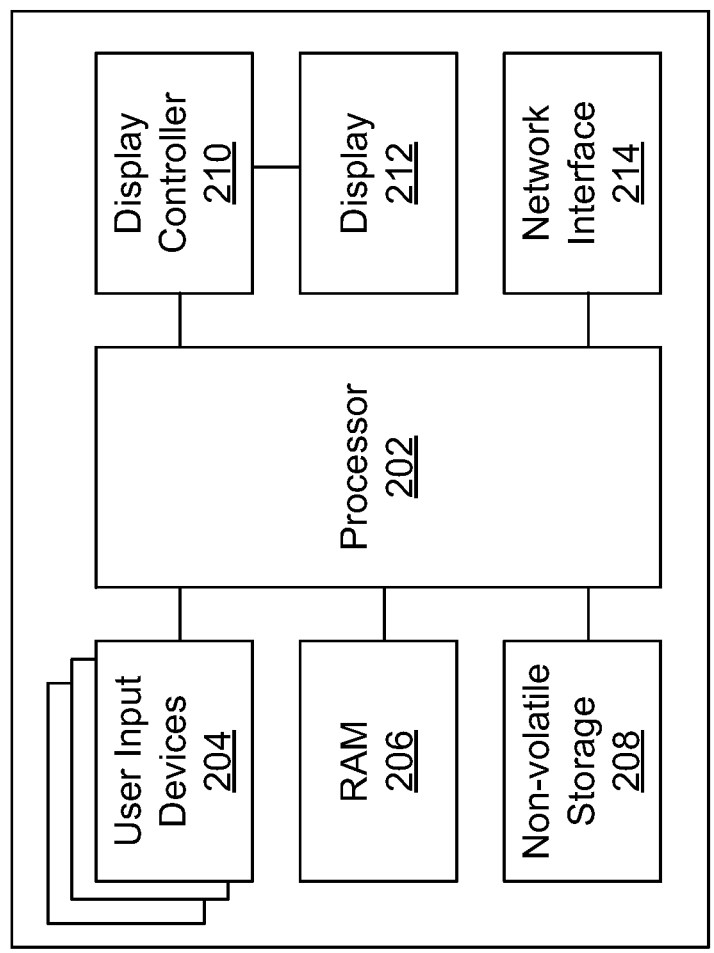
FIG. 2 is a block diagram of a server comprising part of the system depicted in FIG. 1.

Referring now to FIG. 2, there is depicted an example embodiment of one of the servers 108 that comprises the data center 106. The server comprises a processor 202 that controls the server's 108 overall operation. The processor 202 is communicatively coupled to and controls several subsystems. These subsystems comprise user input devices 204, which may comprise, for example, any one or more of a keyboard, mouse, touch screen, voice control; random access memory ("RAM") 206, which stores computer program code for execution at runtime by the processor 202; non-volatile storage 208, which stores the computer program code executed by the RAM 206 at runtime; a display controller 210, which is communicatively coupled to and controls a display 212; and a network interface 214, which facilitates network communications with the wide area network 104 and the other servers 108 in the data center 106. The non-volatile storage 208 has stored on it computer program code that is loaded into the RAM 206 at runtime and that is executable by the processor 202. When the computer program code is executed by the processor 202, the processor 202 causes the server 108 to implement a method for detecting a cybersecurity breach such as is described in more detail in respect of FIG. 6 below. Additionally or alternatively, the servers 108 may collectively perform that method using distributed computing. While the system depicted in FIG. 2 is described specifically in respect of one of the servers 108, analogous versions of the system may also be used for the user devices 104.

The need to detect SAs and/or ATOs can manifest in several ways in the cybersecurity context. For example, an individual may use one of the user devices 104 to access one or more SAs to perform activities that contravene the data center's 106 cybersecurity policies. Additionally or alternatively, an individual may perform ATOs to take control of authentic user accounts and their associated bank accounts. The individual may then use the SAs and the accounts taken over in the ATOs for concerted fraudulent activities, as mentioned above. For example, the individual may transfer funds from a taken over bank account to multiple SAs, and from those SAs withdraw relatively small amounts of cash from various ATMs 110 in an attempt to circumvent existing security policies. However, these linkages between accounts result in electronic evidence that the server 108 detects and uses to score accounts to determine whether they represent a cybersecurity breach; i.e., whether for any particular account, the account is an SA or has been taken over in an ATO.

Figure 6:
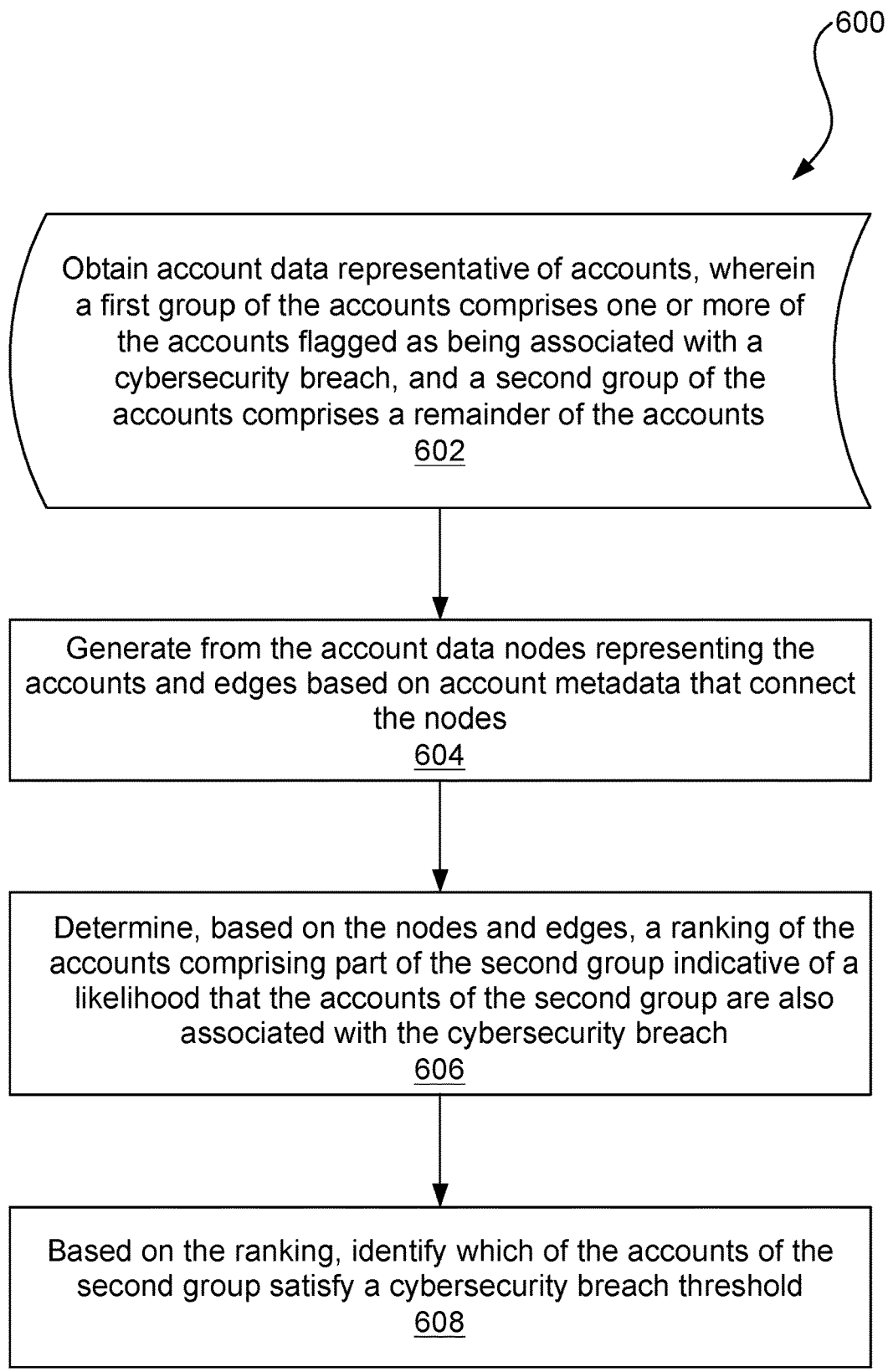
FIG. 6 is a flowchart of a method for detecting a cybersecurity breach, according to an example embodiment.

In at least some example embodiments, the server 108 may perform a method 600 for detecting a cybersecurity breach as depicted in the flowchart of FIG. 6. In FIG. 6, the method 600 starts at block 602 where the server 108 obtains electronic account data representative of various accounts and related metadata. A first group of the accounts comprises one or more of the accounts flagged as being SAs and/or ATOS, thereby being associated with a cybersecurity breach ("flagged accounts"). A second group of the accounts comprises a remainder of the accounts not flagged as being associated with the cybersecurity breach, but that may nonetheless be part of the breach ("potentially compromised accounts"). The potentially compromised accounts and the flagged accounts may be linked by, for example, metadata such as IP address and/or mailing address.

Once the server 108 obtains the account data, it generates at block 604 from the account data nodes representing the accounts and edges based on the account metadata that connect the nodes. In the presently described embodiment the server 108 does this as part of visually generating a graph such as that shown in FIG. 5 and discussed further below; in at least some other embodiments, the server 108 may perform the method 600 of FIG. 6 using on the nodes and edges and without visually generating any graphs. As discussed in further detail below, in at least some example embodiments the graph comprises nodes representing the accounts or proxies therefor (e.g., each node may represent a reference number that itself identifies any one or more accounts) and edges that represent account linkages and that connect the nodes. In other example embodiments (not depicted), the nodes may represent a different type of data, such as branches of the financial institution or ATMs.

After block 604, at block 606 the server 108 determines, based on the nodes and edges in the graph generated at block 604, a ranking of the accounts comprising part of the first and/or second groups. This ranking is used to determine a likelihood that the accounts of the second group are also associated with the cybersecurity breach. As described further below, in at least some embodiments the ranking may be generated using a personalized or non-personalized version of the PageRank™ scoring methodology method. The PageRank™ methodology is an example of a suitable link analysis method that the server 108 may apply for ranking; more generally, the server 108 may apply any suitable link analysis method or any other suitable method, such as a label propagation method or by applying graph neural networks. Where the nodes on the graph directly represent accounts, the ranking that the server 108 determines at block 608 may be directly usable to rank the likelihood an account is an SA or has been subjected to a successful ATO. Where the nodes on the graph represent some other type of data, the server 108 may perform an additional processing operation to map the node to accounts (e.g., where the nodes represent ATMs, the server 108 may identify all the accounts accessed by that ATM within a time window, and then treat the ranking as being applicable to all of those subsequently identified accounts).

Once the ranking is determined, at block 608 the server 108 identifies, based on the ranking, which of the accounts of the second group satisfy the cybersecurity breach threshold. For example, the rankings may be normalized to collectively sum to 1, and the server 108 may identify those accounts having a score of at least 0.75 representing the cybersecurity breach threshold as being associated with the cybersecurity breach.

Figure 3:
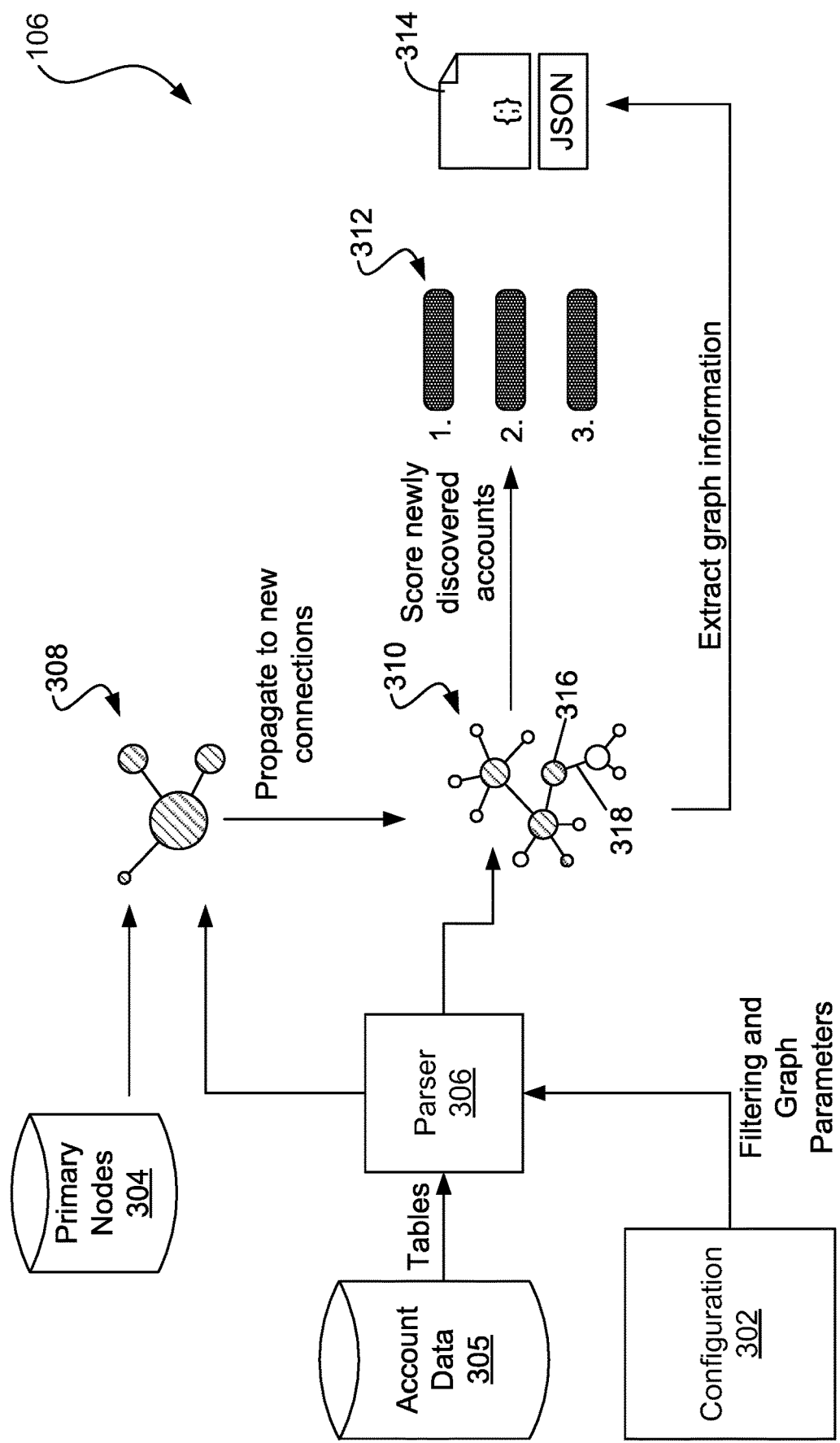
FIG. 3 is a functional block diagram of the system for detecting a cybersecurity breach that comprises part of FIG. 1.

Referring now to FIG. 3, there is depicted a functional block diagram of the data center 106 showing how the data center 106 detects a cybersecurity breach. While the following description is of a particular server 108 performing the method 600, as mentioned above in in some other example embodiments the method 600 may be performed collectively by multiple servers 108 in the data center 106 and/or by multiple data centers 106.

In performing block 602 of FIG. 6, the server 108 first obtains the account data that is representative of the accounts that will form the basis of the graphs. More particularly, the account data comprises data representing the flagged accounts and the potentially compromised accounts. In FIG. 3 the server 108 retrieves the account data from an account data database 305. The account data comprises data such as a list of account numbers and account metadata such as dates of birth used for account holders, dates the accounts were opened, addresses of the account holders, phone numbers of the account holders, and email addresses of the account holders.

The server 108 may also obtain static filters that can be used to filter the account metadata. For example, the server 108 may obtain lookup tables comprising data such as a list of IP addresses used by aggregator services (e.g., Intuit Quickbooks™) that may non-fraudulently be accessing a large number of the accounts and that consequently may otherwise trigger a false positive if not accounted for. The server 108 also obtains in FIG. 3 various other filtering and graph parameters from a configuration service 302, such as information comprising date of birth for users associated with the accounts, account age, and location of last login for the accounts, that the server 108 also uses to filter the account data. The server 108 may perform filtering to reduce the number of accounts represented in the account data 305 that are processed to reduce computational load. For example, the server 108 may filter based on any one or more of when the accounts were opened (e.g., only accounts opened during a particular time window may be subsequently processed), accounts associated with users with identical last names, and where instructions to perform account activity originated from the same geographical area (e.g., as determined by IP address or physical address).

The server 108 implements a parser 306 that parses through the tables from the account data database 305 and the filtering and graph parameters from the configuration service 302 and presents parsed filtering and graph parameters that are ready for use concurrently with the primary nodes from the primary node database 304.

Figure 4:
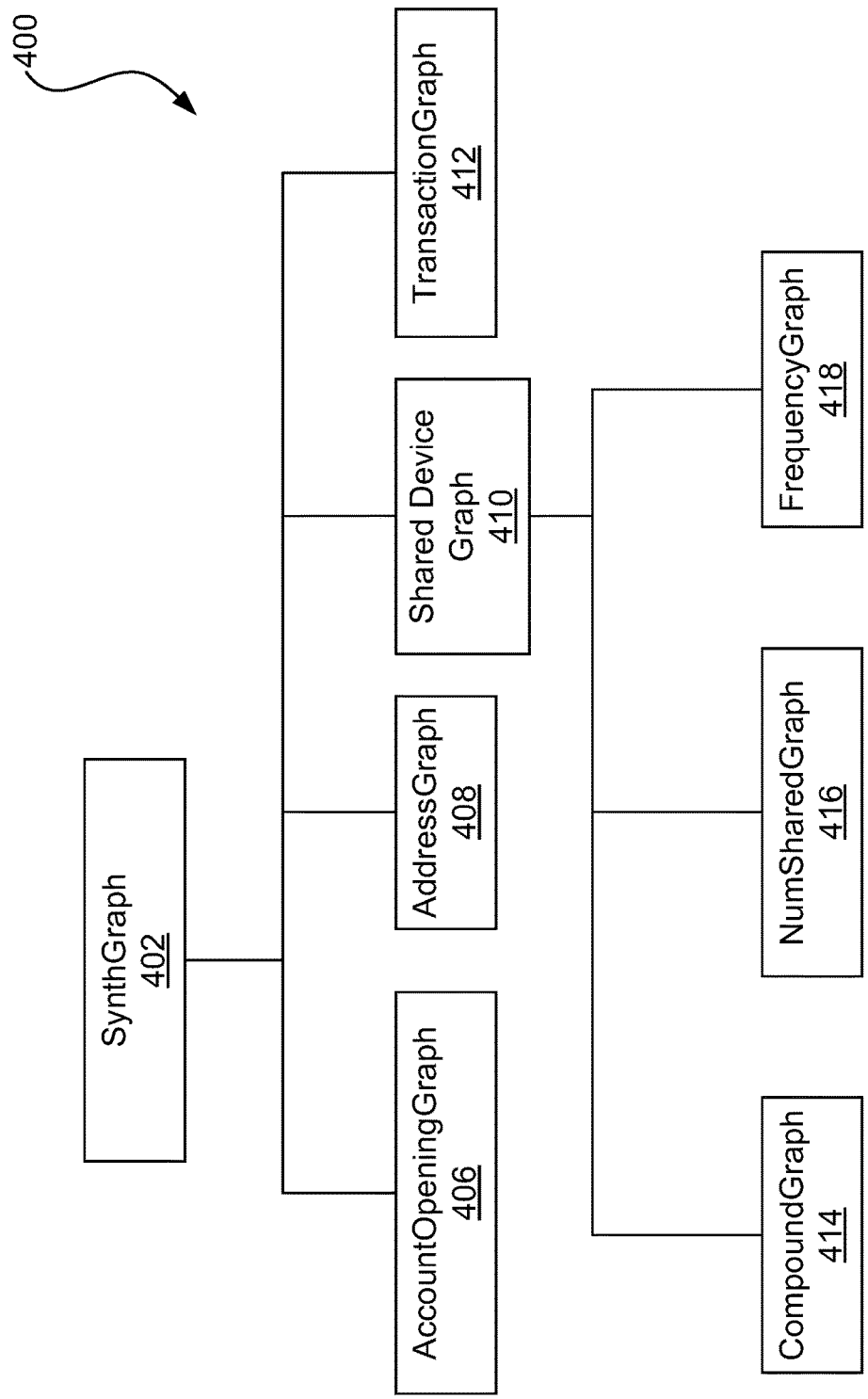
FIG. 4 depicts a graph-type hierarchy used by the system of FIG. 3, according to an example embodiment.

After acquiring the account data and the filtering and graph parameters, the server 108 at block 604 generates a graph from the account data, with the graph comprising nodes 316 that represent the accounts and edges 318 that connect the nodes 316 based on various shared properties represented in the account data as shared metadata types between the accounts. In the depicted examples, the nodes represent the accounts themselves such as by corresponding to the account numbers of accounts. In at least some other embodiments, the nodes 316 may represent users of the system 100, with each of the nodes 316 being associated with one or more accounts. FIG. 4 depicts a graph-type hierarchy 400 of various types of graphs that the server 108 may use. The hierarchy shows nine different graph types: SynthGraph 402, AccountOpeningGraph 406, AddressGraph 408, SharedDeviceGraph 410, TransactionGraph 412, CompoundGraph 414, NumSharedGraph 416, and FrequencyGraph 418. The AccountOpeningGraph 406, AddressGraph 408, SharedDeviceGraph 410, TransactionGraph 412, CompoundGraph 414, NumSharedGraph 416, and FrequencyGraph 418 types are all inherited from the SynthGraph 402 type, and consequently share the node/edge structure of SynthGraph 402.

SynthGraph 402 is a generic graph type describing a graph that comprises at least some SAs and/or accounts taken over in ATOs as nodes. SynthGraph 402 comprises the nodes 316, the edges 318 that connect similar nodes 316 based on electronic evidence of shared device or connection or similar actions performed by the different nodes 316, and functions to process, propagate, and analyze resulting graphs. The edges 318 may be weighted or unweighted, and/or directed or undirected. An "unweighted" relationship is one that represents a binary relationship (e.g., represented by 1 or 0); a "weighted" relationship is one that may be represented by a numeric value other than simply 1 or 0 (e.g., a range of values normalized from 0 to 1); an "undirected" relationship is one represented by a scalar value (e.g., total funds moved through an account); and a "directed" relationship is one represented by a non-scalar value (e.g., a positive number shows net funds flowing into an account, whereas a negative number shows net funds flowing out of an account). The graph types of FIG. 4 that are based on SynthGraph 402 use the same type of nodes 316 as SynthGraph 402 and different types of edges 318, as described below.

AccountOpeningGraph 406 is a graph type in which each of the edges 318 is based on the difference in time (e.g., as measured in days) between opening dates of the accounts represented by the nodes 316 connected by the edge 318. The edges 318 may be weighted, with the weight based on the absolute value of the difference in time between opening dates of the accounts represented by any two of the nodes 316. The closer in time the opening dates are, the larger the weight assigned to the edge 318 connecting the nodes 316. A days threshold sets an upper limit beyond which practically no value is assigned to opening dates. For example, the server 108 may determine the weight assigned to the edge 318 connecting any two nodes 316 as day_weight=|self.days_threshold−tmstmp_diff|/self.days_threshold for tmstmp_diff<.days_threshold and 0 otherwise, where day_weight is the weight of the edge 316, .days_threshold is the cutoff beyond which no value is practically assigned to the edge 316 (e.g. 90 days), and tmstmp_diff is the difference between opening dates for the two nodes 316.

AddressGraph 408 is a graph type in which each of the edges 318 is based on the similarity in address strings associated with the nodes 316 connected by the edge 318. For example, the address strings may be addresses of the users who control the accounts represented by the nodes 316 or of branches of the financial institution used to open the accounts represented by the nodes 316. The server 108 may determine similarity of the strings using any suitable method, such as by determining the Jaro-Winkler distance between the address strings. The weight of any particular edge 318 may be proportional to address similarity.

TransactionGraph 412 is a graph type in which each of the edges 318 is based on the similarity of the transaction histories of the nodes 316 connected by the edge 318. The server 108 determines whether to build the edge 318 and what weight to assign to the edge 318 by condensing the transaction history for each of any two of the nodes 316 into a dense numerical vector using, for example, a Fourier Transform. The server 108 then applies a distance metric such as cosine similarity to assess how similar the numerical vectors for the respective nodes 316 are and assigns the weight of the edge 318 in proportion to that similarity.

SharedDeviceGraph 410 is a graph type in which each of the edges 318 is based on the number of electronic devices used to create or otherwise access the nodes 316 connected by the edge 318 that those nodes 316 have in common. Three different types of graphs are based on and consequently inherit features of SharedDeviceGraph 410: NumSharedGraph 416, FrequencyGraph 418, and CompoundGraph 414.

NumSharedGraph 416 is a graph type in which each of the edges 318 is based on the total number of electronic devices shared between the nodes 316 connected by the edge 316. The edge weight may be set as the number of shared devices as processed using a weighting function: 2×arctan(number of shared values)/π. The weighting function acts as a saturating function that is used to assign diminishing returns to an increasing number of shared devices, representing that practically a certain number of shared devices is sufficient to conclude that two nodes 316 are strongly connected. In at least some embodiments, the use of a weighting function is omitted. And, in at least some embodiments that use a weighting function, a suitable saturating function other than arctan may also be used.

FrequencyGraph 418 is a graph type in which each of the edges 318 is based on the frequency at which electronic devices shared between the nodes 316 connected by the edge 316 are used to access the nodes 316. For any two of the nodes 316 connected by any particular edge 318, the server 108 determines the weight of the edge 318 by:

1. determining the overlap of two normalized distributions respectively corresponding to total transactions vs. time for the two nodes 316. The overlap may be determined as the inverse of the Kullback-Leibler divergence;
2. summing the proportions of shared values for each of the nodes 316; and
3. determining the weight of the edge 318 connecting the nodes 316 from the resulting sum.

CompoundGraph 414 is a subclass of the SynthGraph 402 in which each of the edges 318 is based on both the number of devices shared between the nodes 316 connected by the edge 318 (as in NumSharedGraph 416) and the frequency at which electronic devices shared between the nodes 316 connected by the edge 316 are used to access the nodes 316 (as in FrequencyGraph 418). Edges 318 in CompoundGraph 414 are accordingly a linear combination of the edges 318 in NumSharedGraph 416 and FrequencyGraph 418.

In FIG. 3, the server 108 generates two types of graphs. The server 108 first generates an initial graph 308 in which the graph's 308 primary nodes 316 are users corresponding to the account numbers of the flagged accounts. As part of generating the initial graph 308, the server 108 determines values of a particular property, such as IP address, associated with each node and, depending on the type of graph as described further above in respect of FIG. 4, node metadata. An example of node metadata is a distribution of total transactions for a particular node. The initial graph 308 may be selected from any of the types shown in FIG. 4; as discussed further below, in at least some embodiments the server 108 may generate multiple initial graphs 308 of various of the types of FIG. 4, and those different types of graphs may be subsequently combined as described further below.

The server 108 subsequently connects the nodes 316 using edges based on relationships that vary with graph type as described above. With reference to the different graph types of FIG. 4, in at least some example embodiments the AccountOpeningGraph 406, AddressGraph 408, SharedDeviceGraph 410, CompoundGraph 414, NumSharedGraph 416, and FrequencyGraph 418 have edges that are weighted and undirected; and the TransactionGraph has edges that are weighted and directed. In at least some alternative embodiments, any of the edges of the foregoing graph types may be unweighted and/or the edges of at least some of the AccountOpeningGraph 406, AddressGraph 408, SharedDeviceGraph 410, CompoundGraph 414, NumSharedGraph 416, and FrequencyGraph 418 may be directed (e.g., a directed edge for the SharedDeviceGraph 410 may indicate that one device was used in connection with one of the nodes connected to the edge before the other of the nodes connected to the edge, or a directed edge for the AddressGraph 408 may indicate that one node connected to the edge had an address before the other node connected to the edge).

Once the server 108 generates the initial graph 308 comprising the primary nodes, the server 108 propagates the initial graph 308 to find and add new nodes 316 to form a larger updated graph 310. More particularly, the server 108:
1. identifies new nodes 316 associated with transactions and related metadata, such as IP addresses for accounts involved in those transactions, that share any of the same metadata types as the primary nodes 316;
2. adds those new nodes 316 to the initial graph 308 as secondary nodes 316 to form the updated graph 310, with the shared metadata types identified between the primary nodes 316 and the secondary nodes 316 being used to form the edges connecting the primary to the secondary nodes 316;
3. analogously generates edges connecting the secondary nodes 316 to each other.

In at least some embodiments, the server 108 may add the secondary nodes 316 to the initial graph 308 and not generate edges connecting the secondary nodes 316 to each other.

Figure 5:
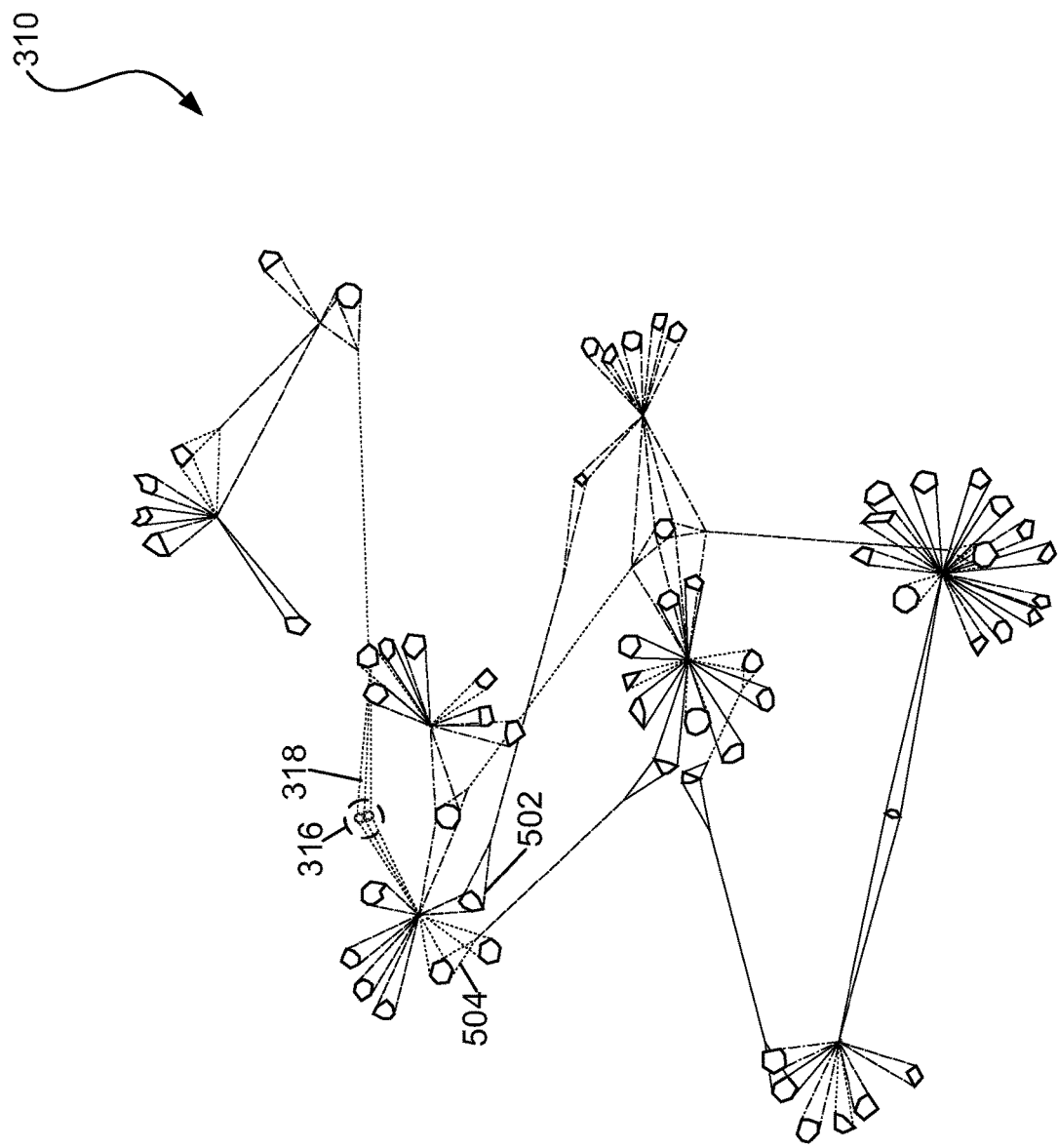
FIG. 5 depicts a graph of accounts used by the system of FIG. 3, according to an example embodiment.

FIG. 5 depicts an example of the updated graph 310 showing different nodes 316 and edges 318. In particular, the differently shaded lines represent different types of linkages. For example, edges 502 in FIG. 5 connect nodes 316 based on IP addresses, while edges 504 in FIG. 5 connect nodes 316 based on spending behavior.

After generating the updated graph 310, the server 108 performs block 606 and determines, from the updated graph 310, a ranking of the potentially compromised accounts by scoring the corresponding nodes on the updated graph 310. The server 108 may use any appropriate scoring methodology, such as the personalized PageRank™ scoring methodology.

More particularly, when applying the personalized PageRank™ methodology, the server 108 starts from a set of given source nodes 316 and walks randomly on the graph 310 following the edges 318. As discussed above, some of the edges 318 may be weighted to introduce a preferentiality while moving from node 316 to node 316. The server 108 does this random walk many times in order to assess the probability of landing upon the other nodes 316 in the graph 310 on the presumption that the journey starts from the source node 316. These probabilities effectively quantify the proximity of the nodes 316 to each other.

Alternatively, the server 108 may apply a non-personalized PageRank™ methodology for scoring. The non-personalized methodology is analogous to the personalized methodology except the non-personalized methodology does not use a predefined set of source nodes 316. Rather, every walk performed by the server 108 is uniformly random and starts from a random one of the nodes 316. The personalized methodology accordingly resembles conditional probability while non-personalized methodology resembles unconditional probability.

The PageRank™ methodology takes as input the graph 310, source node set (if the personalized methodology is used), and optionally some other hyperparameters determining the nature of random walk (e.g., a damping factor set in at least some embodiments to 0.85) and returns back a dictionary in which keys represent the nodes 316 of the graph 310 and associated values are the scoring value for the nodes 316. Examples of this scoring methodology are described in one or more of U.S. Pat. Nos. 6,285,999, 6,799,176, 7,058,628, and 7,269,587, the entireties of all of which are incorporated by reference.

As applied to detection of SAs and accounts taken over in ATOS, as described above the nodes 316 of the graph 310 represent accounts that are connected to each other via the edges 318. Depending on the type of graph as described above in respect of FIG. 4, the edges 318 can represent different properties. For example, the edges 318 may be weighted by the number or frequency of shared properties, such as when the graph 310 is of type CompoundGraph 414, NumSharedGraph 416, or FrequencyGraph 418. The scoring methodology is used to quantify the proximity of potentially compromised accounts to flagged accounts. The flagged accounts are used as a set of source nodes 316, and the scoring methodology determines the proximity from the flagged accounts to the potentially compromised accounts represented by the other nodes 316 in the graph 310.

Applying this scoring methodology, the server 108 generates a ranking 312 of the nodes 316 of the updated graph 310 corresponding to the potentially compromised accounts in which the nodes 316 are ranked. Based on the ranking 312, the server 108 identifies at block 608 which of the potentially compromised accounts to flag as SAs or as accounts that have been taken over in an ATO. In at least some embodiments, the potentially compromised accounts represented by the secondary nodes may score higher than the accounts represented by the primary nodes. The server 108 may, for example, compare the scores for the nodes 316 to the cybersecurity breach threshold, with those scores at or above the threshold being identified as representing accounts that are SAs or that have been subjected to ATOS, or that are deemed to justify further investigation or analysis by virtue of being sufficiently likely to be SAs or to have been subject to ATOs. The server 108 may also extract information from the updated graph 310 and store it in an output file 314, such as a JSON file. An excerpt from an example JSON file follows, illustrating example schema for the nodes and the edges connecting the nodes to each other:

```
"nodes": [
  {
    "node_type": "srf",
    "edge_vals": {
      "Smart ID0 ": 8,
      "Smart ID0": 1,
      "Smart ID1": 1,
      "Address1": 10
    },
    "edge_likelihood": {
      "Smart ID0 ": 0.8,
      "Smart ID0": 0.1,
      "Smart ID1": 0.1,
      "Address1": 1.0
    },
    "color": "red",
    "synth_score": 0.20529682421256282,
    "opening_tmstmp": "2020-11-19 15:00:06.0",
    "id": "1"
  }
  [...]
  "links": [
  {
    "weight": 0.22499999999999998,
    "shared_feature": [
      "Smart ID1"
    ],
    "xcn_count": 3,
    "color": "orange",
    "source": "1",
    "target": "2",
    "key": 0
  }
```

In the above example scheme, the "srf" node_type is a proxy for an account number and the various "edge_vals" represent different types of metadata on which the edges 318 may be based.

The server 108 may also in at least some embodiments combine various scores together. When combining various graphs together, the server 108 standardizes the graph rankings by populating them with all possible nodes 316 as depicted and discussed in more detail in respect of FIGS. 8A and 10A below. For example, a node 316 present in a graph 310 of type NumSharedGraph 416 is also added to a graph 310 of type AddressGraph 408; in this example, the node 316 added to the AddressGraph 408 type graph 310 has a score of zero as it has no edges.

For each of the graphs 310 populated in this way, the rankings generated are normalized so that the total rankings sum to 1, simulating a probability distribution. The server 108 applies a divergence measure to compare each of the graphs 310 in a pairwise fashion. In at least some embodiments, the server 108 combines the overall divergence scores for each of the graphs 310 and uses them to determine weighting of each graph ranking. This approach rewards corroboration while punishing strong divergence from other graphs. The server 108 may again generate the ranking 312 and/or output file 314.

In at least some embodiments in which this combination is performed, the server 108 determines the PageRank™ of each of the various graphs 310, the results of which are expressed as one or more vectors for each graph 310. The server 108 then determines the Kullback-Leibler divergence matrix for each of those vectors. The server 108 sums the rows of the Kullback-Leibler divergence matrices and then inverts and normalizes (e.g., to 1) the resulting combination to determine a weighting for the combination of graphs 310.

The server 108 then multiplies that weighting by the PageRank™ distribution to arrive at score for the combined graphs 310.

Examples

FIGS. 7A-7D, 8A, and 8B depict one example set of graphs for nodes 316 in which a link analysis method in the form of the personalized PageRank™ methodology is applied; and FIGS. 9A-9D, 10A, and 10B depict another example set of graphs for the same nodes 316 in which a link analysis in the form of the non-personalized PageRank™ methodology is applied. The results are discussed below.

For both examples, the server 108 obtains electronic account data in the form of a file listing flagged accounts and potentially compromised accounts. The flagged accounts are used for the graphs' primary nodes and the potentially compromised accounts are used for the graphs' secondary nodes. In FIGS. 7A-7D, 8A, 8B, 9A-9D, 10A, and 10B, a first node 316a, fourth node 316d, seventh node 316g, and eighth node 316h are primary nodes; and a second node 316b, third node 316c, fifth node 316e, and sixth node 316f are the secondary nodes.

The following table lists the primary and secondary nodes 316, together with three pieces of metadata for each of the nodes 316 used to establish the edges 318 between the nodes 316: Smart ID, Address, and Account Open Date. Smart ID is a unique identifier for the device used to open the account, with the count representing the number of transactions performed with that device in association with that account; Address is the address of the branch of the financial institution at which the account was opened; and Account Open Date is the date on which the account was opened.

TABLE 1

List of Primary and Secondary Nodes and Related Metadata

| Node No. | Primary or Secondary Node | Smart ID | Address | Account Open Date |
|---|---|---|---|---|
| 1 (316a) | Primary | Smart ID0-count: 9<br>Smart ID1-count: 1 | Address 1 | Nov. 19, 2020 |
| 2 (316b) | Secondary | Smart ID1-count: 2 | Address 1 | Oct. 9, 2020 |
| 3 (316c) | Secondary | Smart ID2-count: 1 | Address 2 | Aug. 9, 2020 |
| 4 (316d) | Primary | Smart ID2-count: 6 | Address 2<br>Address 3 | Aug. 19, 2020 |
| 5 (316e) | Secondary | Smart ID3a-count: 8<br>Smart ID3b-count: 1 | Address 4 | Aug. 19, 2020 |
| 6 (316f) | Secondary | Smart ID4a-count: 1<br>Smart ID4b-count: 1 | Address 4 | Jan. 5, 2001 |
| 7 (316g) | Primary | Smart ID3b-count: 1<br>Smart ID4b-count: 1 | Address 5 | Aug. 19, 1988 |
| 8 (316h) | Primary | Smart ID5-count: 1 | Address 6 | Aug. 19, 2001 |

Figure 7A:
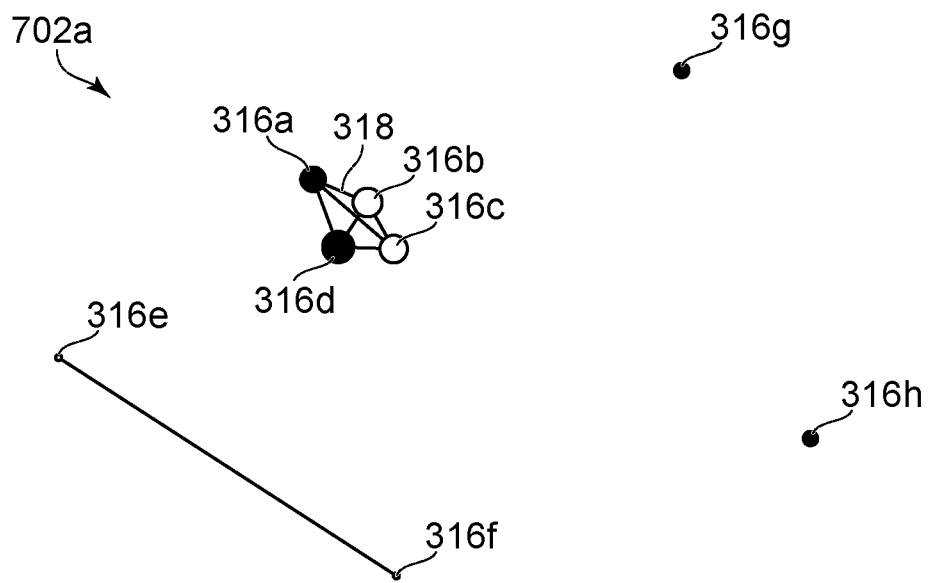
FIGS. 7A, 7B, 7C, and 7D are graphs of accounts used by the system of FIG. 3, according to an example embodiment.
Figure 7B:
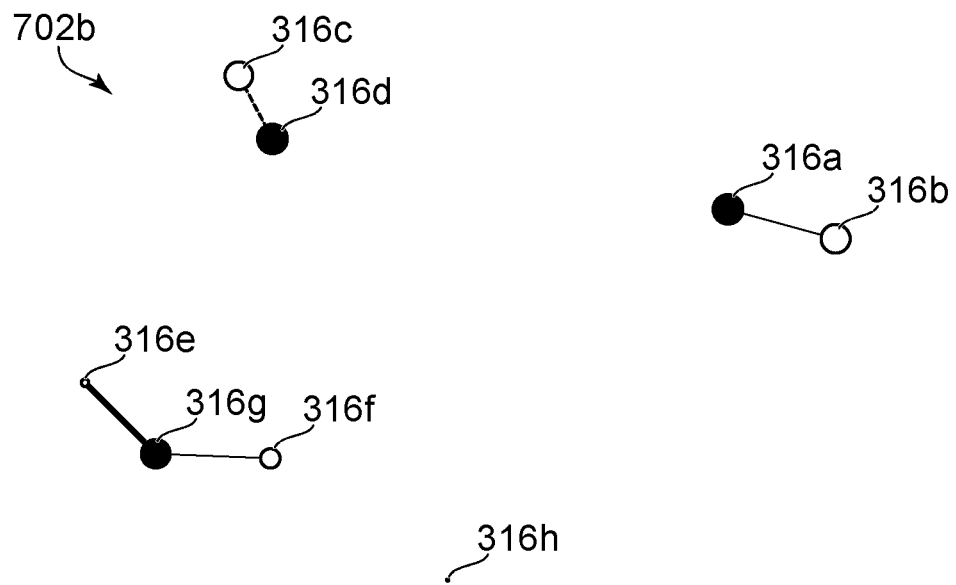
Figure 7C:
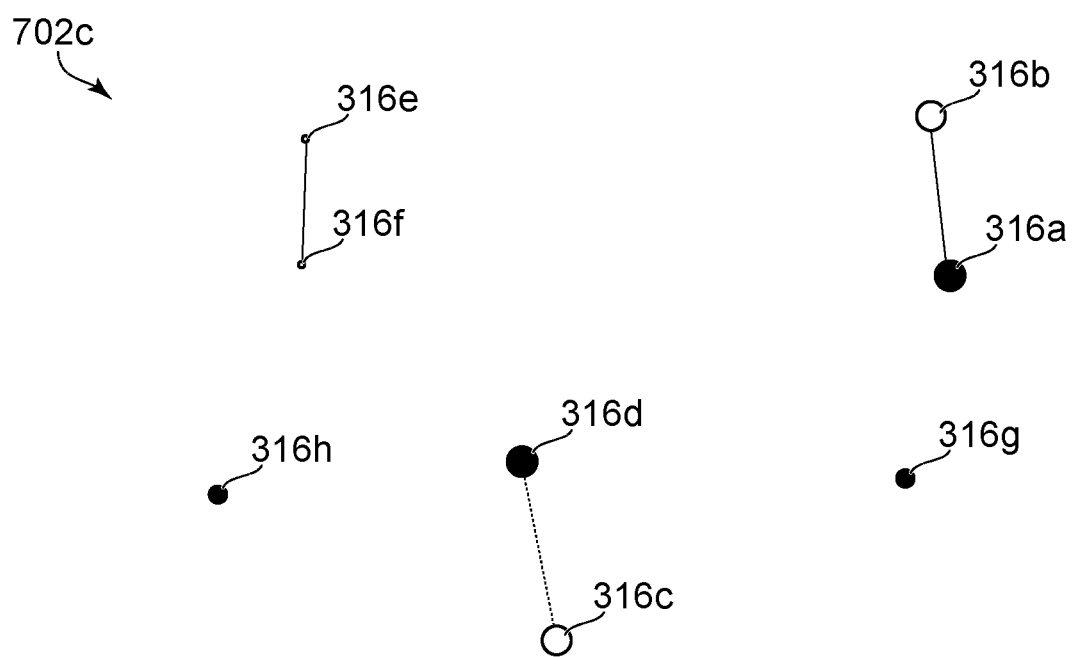
Figure 7D:
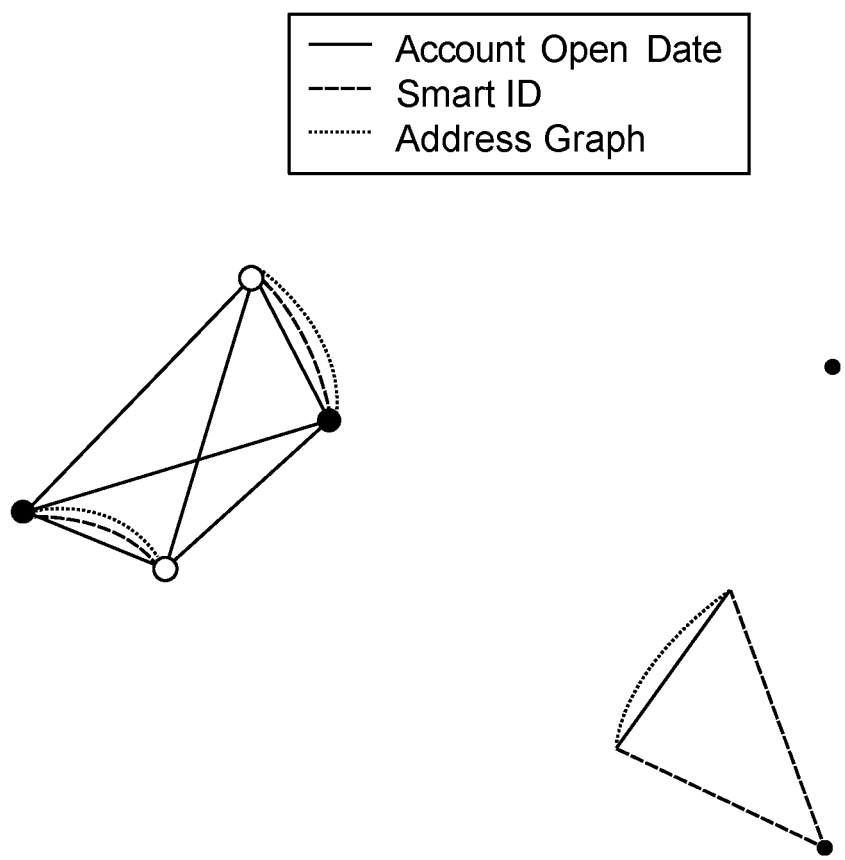
Figure 8A:
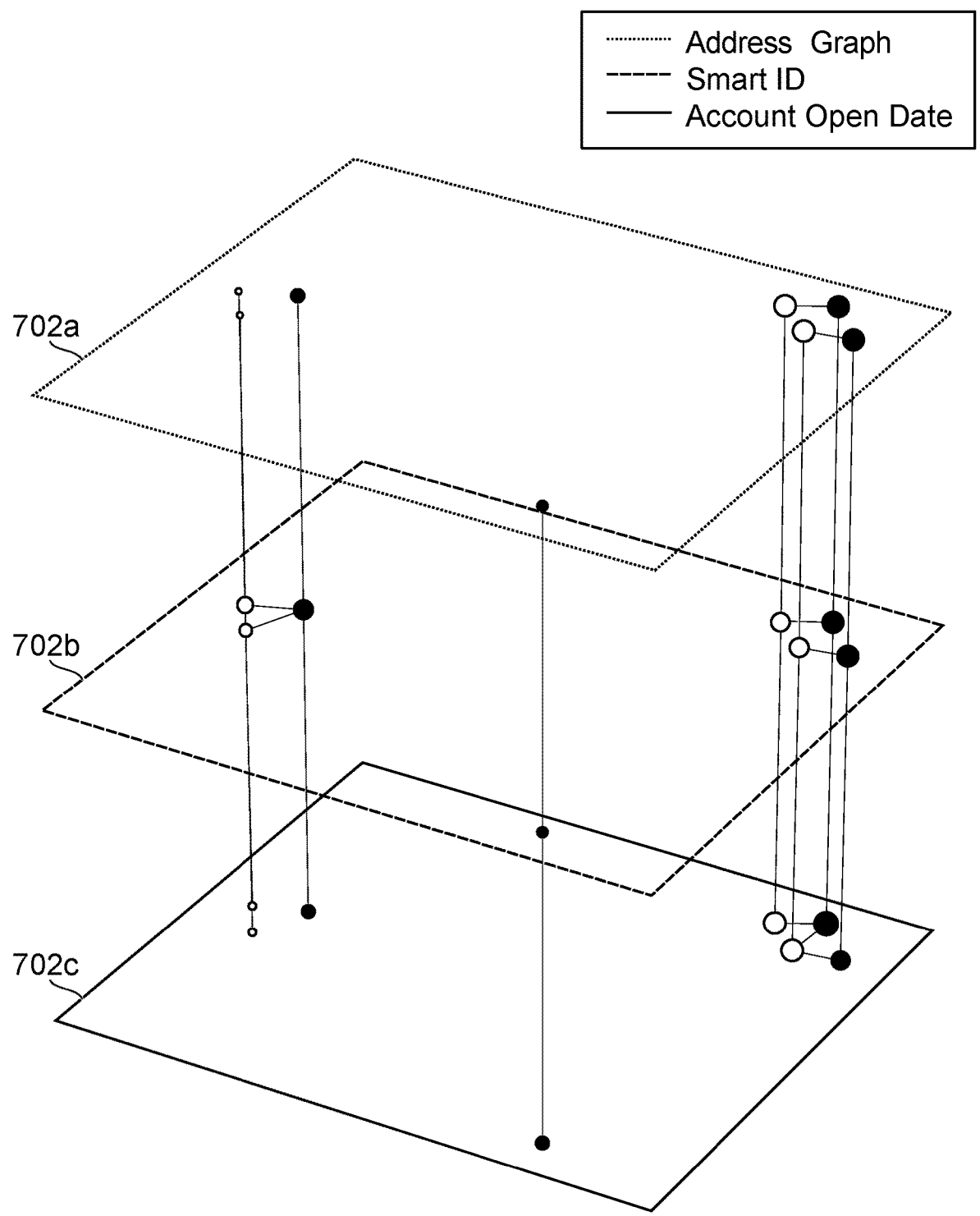
FIGS. 8A and 8B represent a combination of the graphs of FIGS. 7A-7D.
Figure 8B:
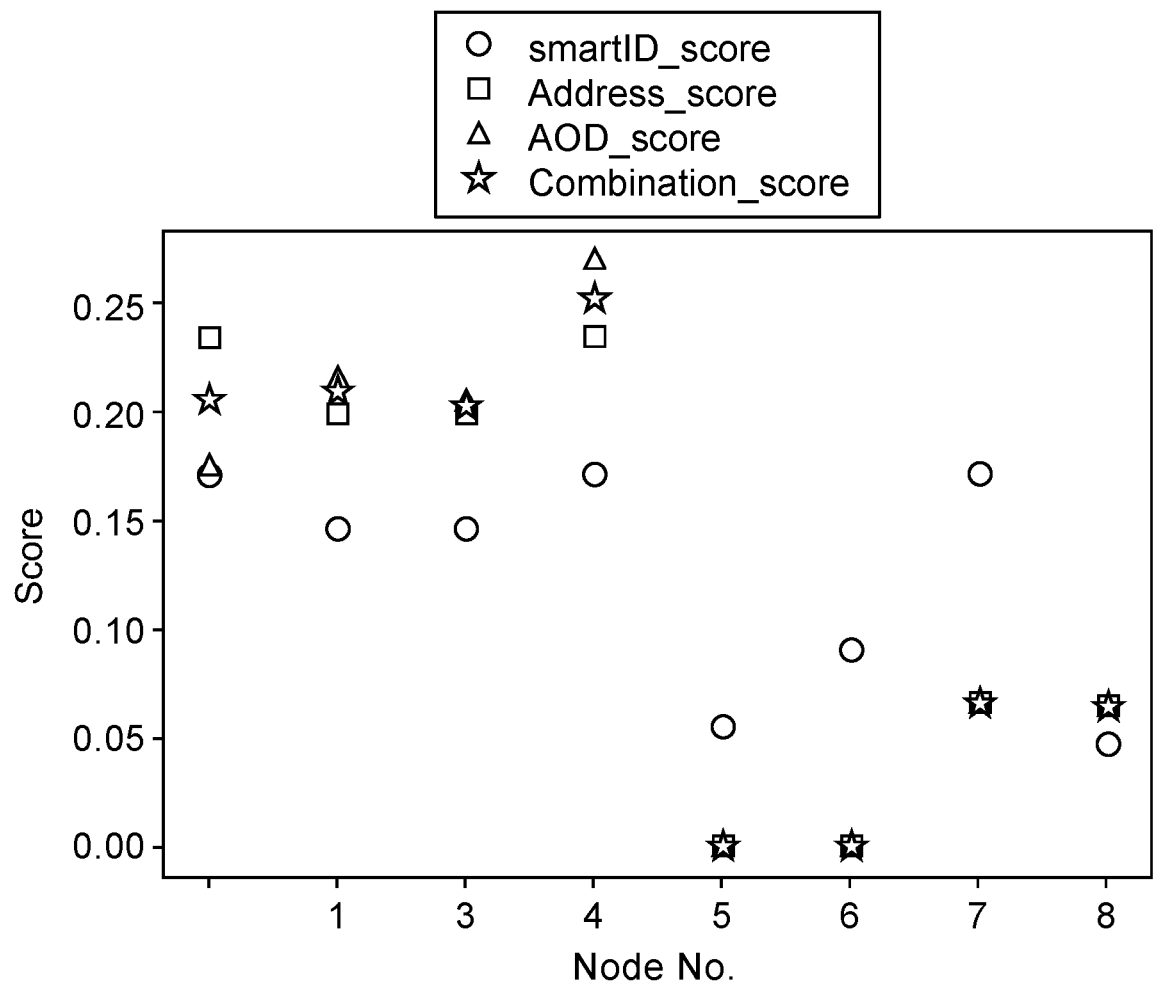
Figure 9A:
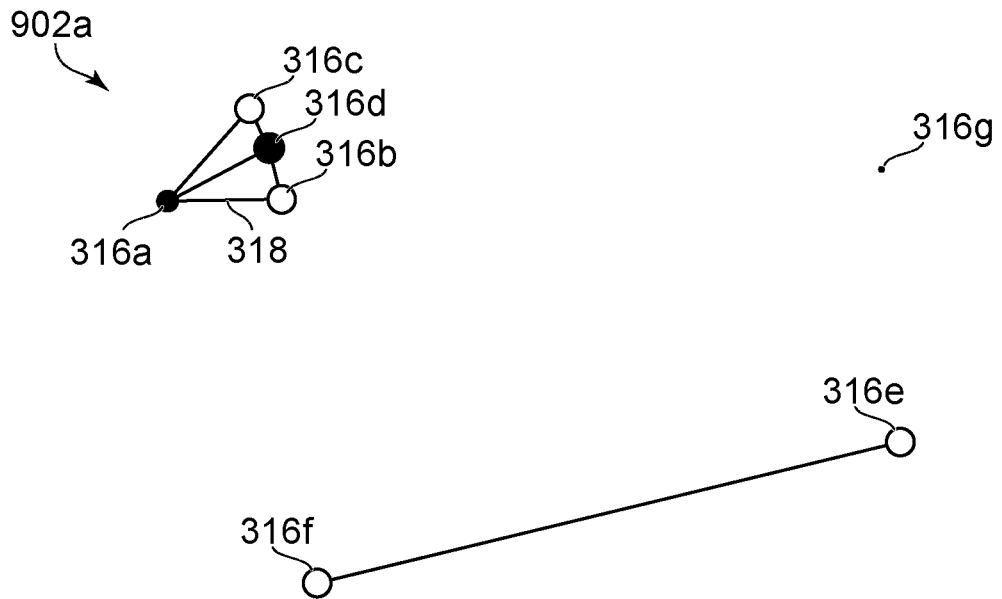
FIGS. 9A, 9B, 9C, and 9D are graphs of accounts used by the system of FIG. 3, according to an example embodiment.
Figure 9B:
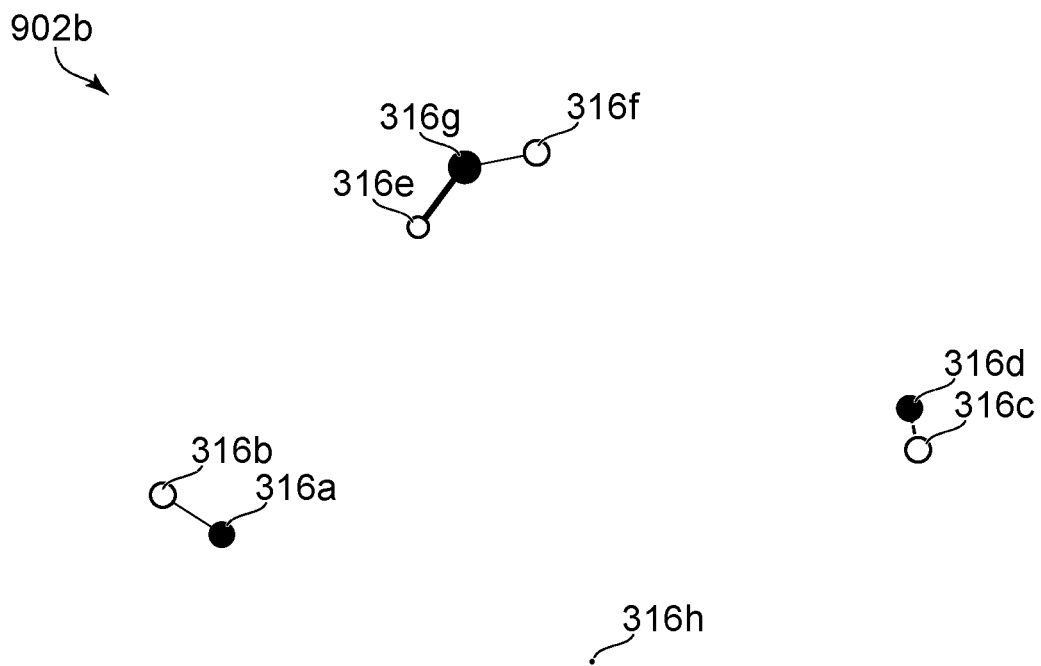
Figure 9C:
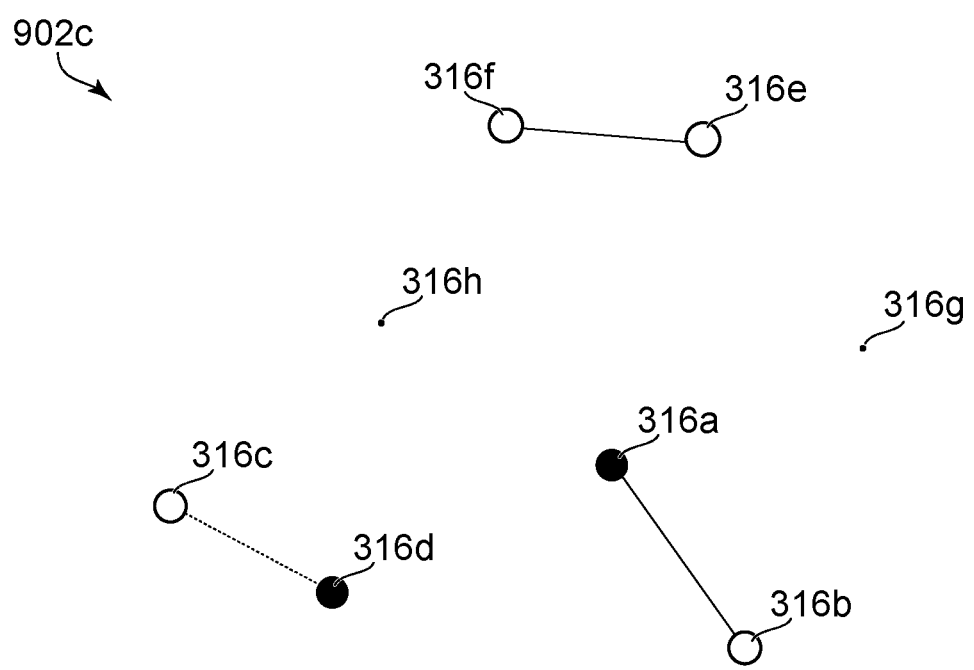
Figure 9D:
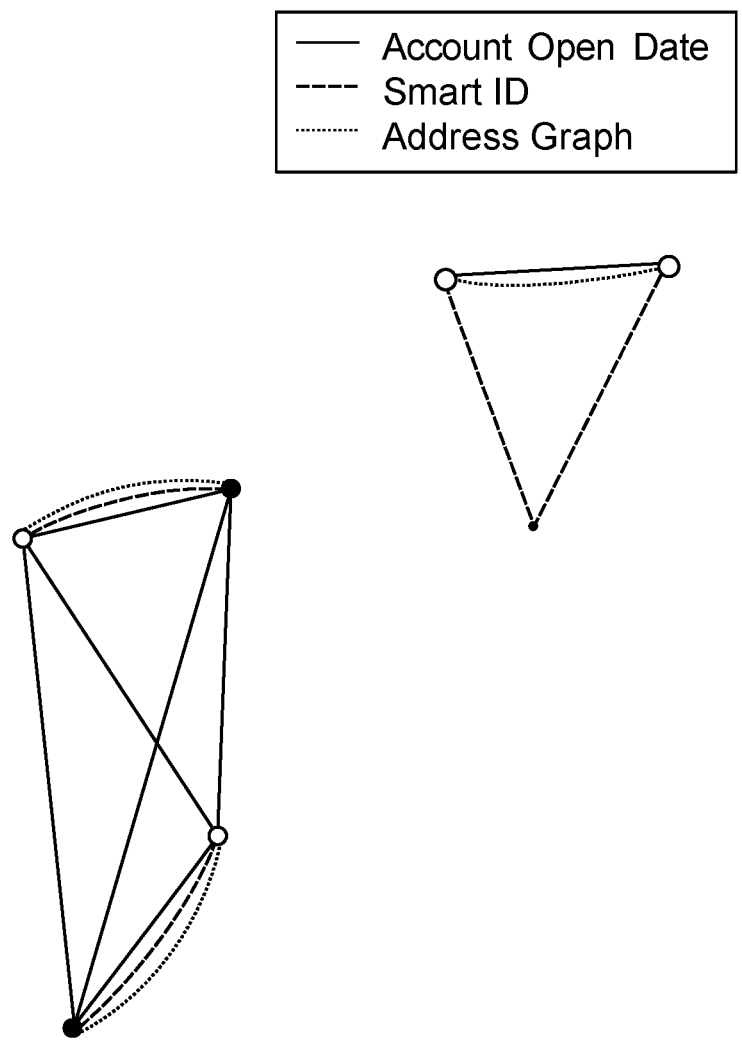

Using the data in Table 1, the server 108 determines a score and generates graphs for each of the nodes 316 by applying the personalized PageRank™ methodology (FIGS. 7A-7D, 8A, and 8B) and by applying the non-personalized PageRank™ methodology (FIGS. 9A-9D, 10A, and 10B). More particularly, the graphs 702*a*, 902*a* of FIGS. 7A and 9A are determined based on the strengths of edges based on Account Open Date, as summarized by the edge weights provided in Table 2 below; the graphs 702*b*, 902*b* of FIGS. 7B and 9B are based on the strengths of edges based on Smart ID, as summarized by the edge weights in Table 3 below; the graphs 702*c*, 902*c* of FIGS. 7C and 9C are based on the strengths of edges based on Address, as summarized by the edge weights in Table 4 below; and the graphs of FIGS. 7D and 9D are graphs that combine the results of the graphs of FIGS. 7A-7C and 9A-9C, respectively. In each of the graphs, the size of the node 316 corresponds to the magnitude of that node's 316 score, while the line weight of the edges 318 represents the strength of the edges 318 between the connected nodes 316. For Table 2, dates separated by more than 150 days are deemed to not be connected to each other (i.e., there is no edge 318 connecting nodes 316 whose account open dates are separated by more than 150 days).

TABLE 2

Account Open Date Edge Weights Between Various Nodes

| Node. No. | 1 | 2 | 3 | 4 | 5 | 6 | 7 | 8 |
|---|---|---|---|---|---|---|---|---|
| 1 | N/A | 0.528 | 0.1024 | 0.1495 | 0 | 0 | 0 | 0 |
| 2 | 0.528 | N/A | 0.352 | 0.4356 | 0 | 0 | 0 | 0 |
| 3 | 0.1024 | 0.352 | N/A | 0.8711 | 0 | 0 | 0 | 0 |
| 4 | 0.1495 | 0.4356 | 0.8711 | N/A | 0 | 0 | 0 | 0 |
| 5 | 0 | 0 | 0 | 0 | N/A | 0.0054 | 0 | 0 |
| 6 | 0 | 0 | 0 | 0 | 0.0054 | N/A | 0 | 0 |
| 7 | 0 | 0 | 0 | 0 | 0 | 0 | N/A | 0 |
| 8 | 0 | 0 | 0 | 0 | 0 | 0 | 0 | N/A |

TABLE 3

Smart ID Edge Weights Between Various Nodes

| Node. No. | 1 | 2 | 3 | 4 | 5 | 6 | 7 | 8 |
|---|---|---|---|---|---|---|---|---|
| 1 | N/A | 0.2249 | 0 | 0 | 0 | 0 | 0 | 0 |
| 2 | 0.2249 | N/A | 0 | 0 | 0 | 0 | 0 | 0 |
| 3 | 0 | 0 | N/A | 0.5625 | 0 | 0 | 0 | 0 |
| 4 | 0 | 0 | 0.5625 | N/A | 0 | 0 | 0 | 0 |
| 5 | 0 | 0 | 0 | 0 | N/A | 0 | 0.2292 | 0 |
| 6 | 0 | 0 | 0 | 0 | 0 | N/A | 0.375 | 0 |
| 7 | 0 | 0 | 0 | 0 | 0.2292 | 0.375 | N/A | 0 |
| 8 | 0 | 0 | 0 | 0 | 0 | 0 | 0 | N/A |

TABLE 4

Address Edge Weights Between Various Nodes

| Node. No. | 1 | 2 | 3 | 4 | 5 | 6 | 7 | 8 |
|---|---|---|---|---|---|---|---|---|
| 1 | N/A | 0.528 | 0 | 0 | 0 | 0 | 0 | 0 |
| 2 | 0.528 | N/A | 0 | 0 | 0 | 0 | 0 | 0 |
| 3 | 0 | 0 | N/A | 0.5 | 0 | 0 | 0 | 0 |
| 4 | 0 | 0 | 0.5 | N/A | 0 | 0 | 0 | 0 |
| 5 | 0 | 0 | 0 | 0 | N/A | 0.5625 | 0 | 0 |
| 6 | 0 | 0 | 0 | 0 | 0.5625 | N/A | 0 | 0 |
| 7 | 0 | 0 | 0 | 0 | 0 | 0 | N/A | 0 |
| 8 | 0 | 0 | 0 | 0 | 0 | 0 | 0 | N/A |

Figure 10A:
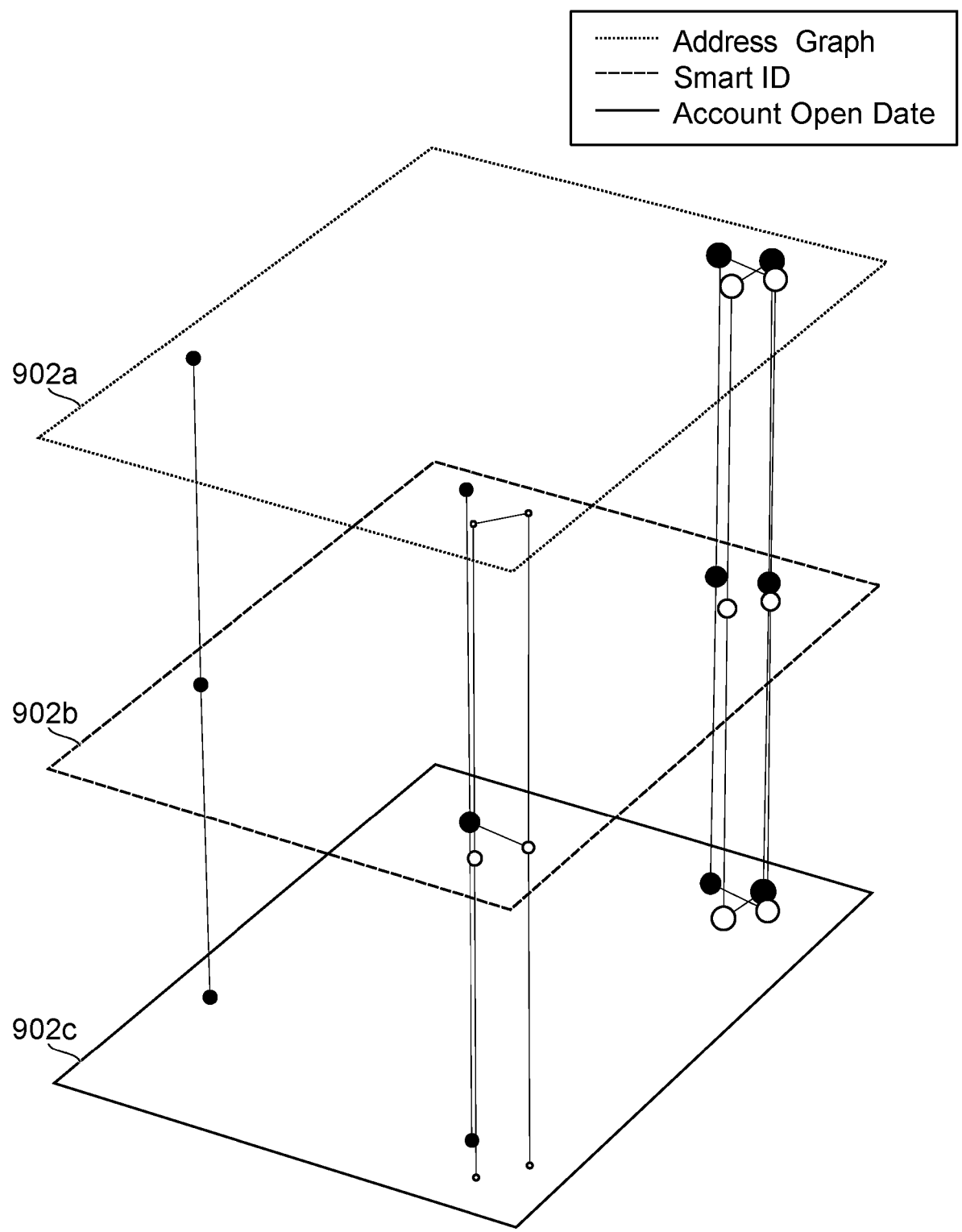
FIGS. 10A and 10B represent a combination of the graphs of FIGS. 9A-9D.
Figure 10B:
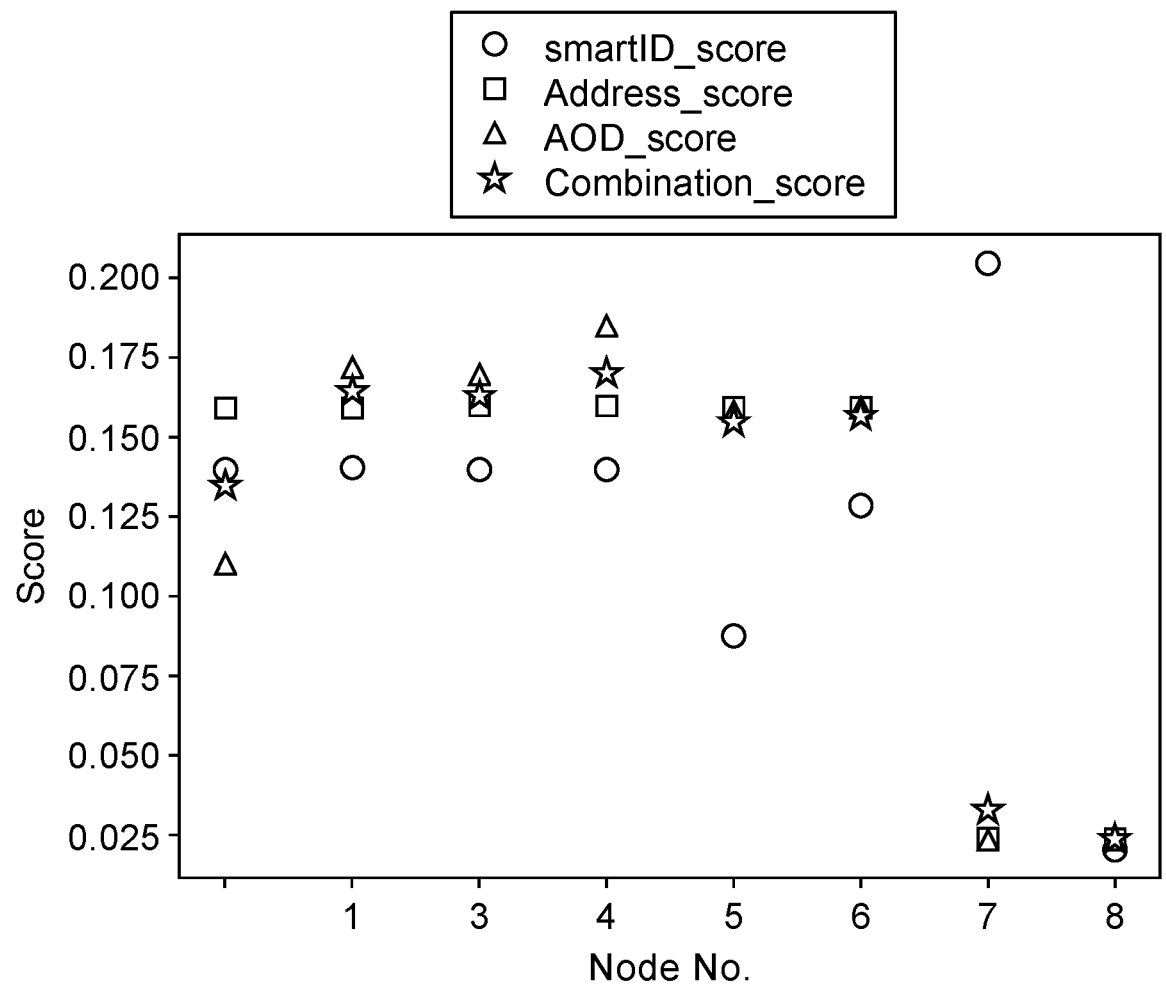

FIGS. 8A and 10A respectively show the personalized PageRank™ methodology graphs 702a-c superimposed on each other and the non-personalized PageRank™ methodology graphs 902a-c superimposed on each other. FIGS. 8B and 10B respectively show graphs of each of the PageRank™ scores (referred to in FIGS. 8B and 10B as a "synth" score) resulting from the graphs 702a-c and 902a-c respectively, and a total PageRank™ score based on the individual scores as determined in conjunction with those graphs 702a-c, 902a-c. In FIGS. 8B and 10B, as discussed above, the total score is determined as by determining the PageRank™ score for each of the graphs, which is a vector; determining the Kullback-Leibler divergence matrix for each of those vectors; summing the rows of the matrices; inverting and normalizing the sum to arrive at an ensemble weighting; and then applying that weighting to the PageRank™ score itself to arrive at the combined score.

Referring to FIG. 8B in respect of the score determined using the personalized PageRank™ methodology, the flagged accounts generally score higher than the potentially compromised accounts. For example, the eighth node 316h, which is not linked to any of the other nodes 316a-g, nonetheless scores higher than the fifth and sixth nodes 316e,f, both of which are linked to the seventh node 316h, which is a flagged account, in the Smart ID graph 702b, and which are also linked to each other in the Account Open Date and Address graphs 702a,c. As the contribution to the PageRank™ score from the Account Open Date and Address graphs 702a,c is very small by virtue of neither the fifth and sixth nodes 316e,f being primary nodes, the combined score for those nodes 316e,f is relatively low.

Referring to FIG. 10B, the non-personalized PageRank™ methodology scores each of the nodes 316a-h independent of whether it is a primary node or not. Random walks can happen from any of the nodes 316a-h, and thus the primary nodes do not necessarily obtain a higher score unless they are part of a cluster of connected nodes. In contrast to how they score using the personalized PageRank™ methodology, the fifth and sixth nodes 316e,f when using the non-personalized PageRank™ methodology score higher than the seventh and eighth nodes 316g,h, which are both primary nodes. This higher score results from the edge 318 linking the fifth and sixth nodes 316e,f together in the Account Open Date and Address graphs 902a,c, and by virtue of the non-personalized methodology is higher than the score of the unconnected seventh and eighth nodes 316g,h, which are both primary nodes.

As demonstrated above, the non-personalized PageRank™ methodology determines a score for each node 316 by counting the number of edges 318 to/from each of the nodes 316 and also considering their weight, which is a reflection of the quality or strength of the association between the nodes 316 connected by any particular edge 318. The personalized PageRank™ methodology is similar except it defines the importance of each of the nodes 316 based on its relevance to a given set of nodes 316; in other words, the walks used to determine the scores for the nodes 316 always start from that given set of nodes 316, which in at least some example embodiments are the primary nodes that represent flagged accounts or suspicious accounts. The personalized PageRank™ methodology may accordingly be used when the server 108 is focusing on nodes 316 that share properties with known SAs or accounts taken over in ATOs. In contrast, the non-personalized PageRank™ methodology scores nodes 316 independently of whether they are connected to known SAs or accounts taken over in ATOS, and accordingly may be used for example when identifying new clusters of SAs or accounts taken over in ATOs. This use case may arise, for example, when identifying accounts compromised by a rogue financial institution employee.

The processor used in the foregoing embodiments may comprise, for example, a processing unit (such as a processor, microprocessor, AI accelerator, or programmable logic controller) or a microcontroller (which comprises both a processing unit and a non-transitory computer readable medium). Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory. As an alternative to an implementation that relies on processor-executed computer program code, a hardware-based implementation may be used. For example, an application-specific integrated circuit (ASIC), field programmable gate array (FPGA), system-on-a-chip (SoC), or other suitable type of hardware implementation may be used as an alternative to or to supplement an implementation that relies primarily on a processor executing computer program code stored on a computer medium.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method comprising:
   (a) obtaining electronic account data representative of accounts, wherein a first group of the accounts comprises one or more of the accounts flagged as being associated with a cybersecurity breach, and a second group of the accounts comprises a remainder of the accounts;
   (b) generating from the account data nodes representing the accounts and edges based on account metadata that connect the nodes, wherein the generating comprises:
      generating the nodes and edges for the first group of the accounts;
      identifying from the account data at least some of the second group of the accounts sharing metadata with the first group of the accounts;
      adding to the nodes and edges for the first group of the accounts the nodes for at least some of the second group of the accounts that share metadata with the first group of the accounts; and
      generating the edges connecting the nodes for the first group of the accounts to the nodes for at least some of the second group of the accounts;
   (c) determining, based on the nodes and edges, a ranking of the accounts comprising part of the second group indicative of a likelihood that the accounts of the second group are also associated with the cybersecurity breach; and
   (d) based on the ranking, identifying which of the accounts of the second group satisfy a cybersecurity breach threshold.

2. The method of claim 1, wherein generating the nodes and edges comprises visually generating a graph comprising the nodes and edges.

3. The method of claim 1, wherein determining, based on the nodes and edges, the ranking of the accounts comprises applying a link analysis method to the nodes and edges.

4. The method of claim 3, wherein applying the link analysis method is personalized.

5. The method of claim 3, wherein applying the link analysis method is non-personalized.

6. The method of claim 1, further comprising storing in an output file, according to a schema, values for the nodes and the edges.

7. The method of claim 1, wherein each of at least some of the edges is based on a difference in time between opening dates of the accounts represented by the nodes connected by the edge.

8. The method of claim 1, wherein each of at least some of the edges is based on a similarity in address strings associated with the nodes connected by the edge.

9. The method of claim 1, wherein each of at least some of the edges is based on a similarity of transaction histories of the nodes connected by the edge.

10. The method of claim 1, wherein each of at least some of the edges is based on a number of electronic devices used to create or otherwise access the nodes connected by the edge.

11. The method of claim 1, wherein each of at least some of the edges is based on a total number of electronic devices shared between the nodes connected by the edge.

12. The method of claim 1, wherein each of at least some of the edges is based on a frequency at which electronic devices shared between the nodes connected by the edge are used to access the nodes connected by the edge.

13. The method of claim 1, wherein each of at least some of the edges is based on a linear combination of:
   (a) a total number of electronic devices shared between the nodes connected by the edge; and
   (b) a frequency at which electronic devices shared between the nodes connected by the edge are used to access the nodes connected by the edge.

14. The method of claim 1, wherein the edges represent multiple types of metadata.

15. The method of claim 14, wherein determining the ranking comprises:
   (a) determining respective rankings for the multiple types of metadata; and
   (b) combining the rankings for the multiple types of metadata together into an overall ranking.

16. The method of claim 15, wherein determining, based on the nodes and edges, the ranking of the accounts comprises applying a link analysis method to the nodes and edges, and wherein combining the rankings comprises:
   (a) respectively expressing the rankings for the multiple types of metadata as vectors;
   (b) determining respective Kullback-Leibler divergence matrices for the vectors;
   (c) summing rows of the divergence matrices;
   (d) inverting and normalizing a resulting sum of the divergence matrices to determine a weighting; and
   (e) multiplying the weighting by a link analysis method distribution to arrive at the overall ranking.

17. The method of claim 1, wherein the cybersecurity breach comprises at least one of a synthetic account having been created on a computer system or an account having been subjected to an account takeover on the computer system.

18. A system comprising:
   (a) at least one database comprising electronic account data representative of accounts, wherein a first group of the accounts comprises one or more of the accounts flagged as being associated with a cybersecurity breach, and a second group of the accounts comprises a remainder of the accounts;

(b) at least one processor communicatively coupled to the at least one database; and
(c) at least one memory having stored thereon computer program code that is executable by the at least one processor and that, when executed by the at least one processor, causes the at least one processor to perform a method comprising:
  (i) obtaining the electronic account data representative of the accounts;
  (ii) generating from the account data nodes representing the accounts and edges based on account metadata that connect the nodes, wherein the generating comprises:
    generating the nodes and edges for the first group of the accounts;
    identifying from the account data at least some of the second group of the accounts sharing metadata with the first group of the accounts;
    adding to the nodes and edges for the first group of the accounts the nodes for at least some of the second group of the accounts that share metadata with the first group of the accounts; and
    generating the edges connecting the nodes for the first group of the accounts to the nodes for at least some of the second group of the accounts;
  (iii) determining, based on the nodes and edges, a ranking of the accounts comprising part of the second group indicative of a likelihood that the accounts of the second group are also associated with the cybersecurity breach; and
  (iv) based on the ranking, identifying which of the accounts of the second group satisfy a cybersecurity breach threshold.

19. A non-transitory computer-readable medium having stored thereon computer program code that is executable by a processor and that, when executed by the processor, causes the processor to perform a method comprising:
  (a) obtaining electronic account data representative of accounts, wherein a first group of the accounts comprises one or more of the accounts flagged as being associated with a cybersecurity breach, and a second group of the accounts comprises a remainder of the accounts;
  (b) generating from the account data nodes representing the accounts and edges based on account metadata that connect the nodes, wherein the generating comprises:
    generating the nodes and edges for the first group of the accounts;
    identifying from the account data at least some of the second group of the accounts sharing metadata with the first group of the accounts;
    adding to the nodes and edges for the first group of the accounts the nodes for at least some of the second group of the accounts that share metadata with the first group of the accounts; and
    generating the edges connecting the nodes for the first group of the accounts to the nodes for at least some of the second group of the accounts;
  (c) determining, based on the nodes and edges, a ranking of the accounts comprising part of the second group indicative of a likelihood that the accounts of the second group are also associated with the cybersecurity breach; and
  (d) based on the ranking, identifying which of the accounts of the second group satisfy a cybersecurity breach threshold.

* * * * *